United States Patent
Wang et al.

(10) Patent No.: US 10,733,699 B2
(45) Date of Patent: Aug. 4, 2020

(54) FACE REPLACEMENT AND ALIGNMENT

(71) Applicant: VMAXX, Inc., Menlo Park, CA (US)

(72) Inventors: Jinjun Wang, San Jose, CA (US); Qiqi Hou, Portland, OR (US)

(73) Assignee: DEEP NORTH, INC., Foster City, CA (US)

( * ) Notice: Subject to any disclaimer, the term of this patent is extended or adjusted under 35 U.S.C. 154(b) by 220 days.

(21) Appl. No.: 15/792,506

(22) Filed: Oct. 24, 2017

(65) Prior Publication Data

US 2019/0122329 A1 Apr. 25, 2019

(51) Int. Cl.
*G06K 9/00* (2006.01)
*G06T 3/00* (2006.01)
*G06K 9/66* (2006.01)

(52) U.S. Cl.
CPC ........ *G06T 3/0081* (2013.01); *G06K 9/00228* (2013.01); *G06K 9/66* (2013.01); *G06T 3/0093* (2013.01); *G06T 2207/20104* (2013.01); *G06T 2207/30201* (2013.01)

(58) Field of Classification Search
None
See application file for complete search history.

(56) References Cited

U.S. PATENT DOCUMENTS

| 8,406,519 B1* | 3/2013 | Lim ................... G06T 11/00 382/170 |
| 9,799,096 B1* | 10/2017 | De la Torre .......... G06T 3/0093 |
| 2018/0068178 A1* | 3/2018 | Theobalt ............ G06K 9/00315 |
| 2019/0279347 A1* | 9/2019 | Hayasaka .......... G06K 9/00248 |

OTHER PUBLICATIONS

Qiqi Hou, Jinjun Wang, Lele Cheng, Yihong Gong, Facial Landmark Detection Via Cascade Multi-Channel Convolutional Neural Network, 2015, IEEE ICIP 2015, pp. 1800-1804 (Year: 2015).*

* cited by examiner

*Primary Examiner* — Atiba O Fitzpatrick
(74) *Attorney, Agent, or Firm* — David R. Stevens; Stevens Law Group

(57) ABSTRACT

A face replacement system for replacing a target face with a source face can include a facial landmark determination model having a cascade multichannel convolutional neural network (CMC-CNN) to process both the target and the source face. A face warping module is able to warp the source face using determined facial landmarks that match the determined facial landmarks of the target face, and a face selection module is able to select a facial region of interest in the source face. An image blending module is used to blend the target face with the selected source region of interest.

18 Claims, 7 Drawing Sheets

---
Algorithm 1 Framework of face alignment recurrent network: single image version.
---

1: procedure TRAIN( $\{ I_i, \hat{S}_i, S_i^0 \}_{i=1}^N$, $T$ )
2:     while in iterations do
3:         $X_{map,i} \leftarrow I_i, \theta$     ▷ convs, poolings
4:         $x_i^0 = O$
5:         $t \leftarrow 1$
6:         while $t <= T$ do
7:             $X_{roi,i}^{t-1} \leftarrow X_{map,i}, S_i^{t-1}$   ▷ RoI, pooling, concat
8:             $\Delta\hat{S}_i^t \leftarrow \hat{S}_i, S_i^{t-1}$   ▷ calculate gtshape increment
9:             $\Delta S_i^t, x_i^t \leftarrow X_{roi,i}^{t-1}, X_i^{t-1}, \theta$   ▷ fc, LSTM
10:             $S_i^t \leftarrow S_i^{t-1}, \Delta S_i^{t-1}$   ▷ update curshape
11:         end while
12:         $\theta \leftarrow \Delta S_i^1, \cdots \Delta S_i^T, \Delta\hat{S}_i^1, \cdots \Delta\hat{S}_i^T, \theta$
13:     end while
14:     return $\theta$
15: end procedure

16: procedure Test($I, T, \theta$)
17:     $X_{map} \leftarrow I, \theta$   ▷ convs, poolings
18:     $x_i^0 = O$
19:     $t \leftarrow 1$
20:     while $t <= T$ do
21:         $X_{roi}^{t-1} \leftarrow X_{map}, S^{t-1}$   ▷ RoI, pooling, concat
22:         $\Delta S^t, x^t \leftarrow X_{roi}^{t-1}, X^{t-1}, \theta$   ▷ fc, LSTM
23:         $S^t \leftarrow S^{t-1}, \Delta S^{t-1}$   ▷ update curshape
24:     end while
25:     return $S^T$
26: end procedure

Fig. 7

Algorithm 2 Framework of face alignment recurrent network: video version.

1: procedure TRAIN( $\{I_{j,f}, \hat{S}_{j,f}\}_{f=1}^{NF}, S_j^0\}_{j=1}^{NV}, T)$
2:   while in iterations do
3:     $x_{i,0} = 0$
4:     $f \leftarrow 1$
5:     while $f <= F$ do
6:       $X_{map,i,f} \leftarrow I_{i,f}, \theta$
7:       $S_{i,f}^0 = S_{i,f-1}^T$
8:       $x_{i,f}^0 = g(I_{i,f-1}, S_{i,f-1}^T, x_{i,f-1}^T)$
9:       $t \leftarrow 1$
10:      while $t <= T$ do
11:        $X_{roi,i,f}^{t-1} \leftarrow X_{map,i,f}, S_{i,f}^{t-1}$
12:        $\Delta \hat{S}_{i,f}^t \leftarrow \hat{S}_{i,f}, S_{i,f}^{t-1}$
13:        $\Delta S_{i,f}^t, x_{i,f}^t \leftarrow X_{roi,i,f}^{t-1}, X_{i,f}^{t-1}, \theta$
14:        $S_{i,f}^t \leftarrow S_{i,f}^{t-1}, \Delta S_{i,f}^{t-1}$
15:      end while
16:    end while
17:    $\theta \leftarrow \Delta S_{i,0}^1, \cdots \Delta S_{i,F}^T, \hat{S}_{i,0}^1, \cdots \Delta S_{i,F}^T, \theta$
18:  end while
19:  return $\theta$
20: end procedure

21:   procedure Test($\{I_f\}_{f=1}^{NF}, \theta$)
22:     $x_0 = 0$
23:     $f \leftarrow 1$
24:     while $f <= F$ do
25:       $X_{map,f} \leftarrow I_{i,f}, \theta$
26:       $S_f^0 = S_{f-1}^T$
27:       $x_f^0 = g(I_{f-1}, S_{f-1}^T, x_{f-1}^T)$
28:       $t \leftarrow 1$
29:      while $t <= T$ do
30:        $X_{roi,f}^{t-1} \leftarrow X_{map,f}, S_f^{t-1}$
31:        $\Delta \hat{S}_f^t \leftarrow \hat{S}_f, S_f^{t-1}$
32:        $\Delta S_f^t, x_f^t \leftarrow X_{roi,f}^{t-1}, X_f^{t-1}, \theta$
33:        $S_f^t \leftarrow S_f^{t-1}, \Delta S_f^{t-1}$
34:      end while
35:    end while
36:    return $\{S_f\}_{f=1}^F$
37: end procedure

Fig. 9

FACE REPLACEMENT AND ALIGNMENT

TECHNICAL FIELD

The present disclosure relates generally to a neural network based face replacement system for video production. The system can include a face alignment method for locating facial key points given a 2D image.

BACKGROUND

Instead of motion capture or whole-body replacement, face replacement has been used in film production to achieve realistic replacement results. Face replacement is also applicable to social media, virtual, or direct personal interactions such as online video chats.

While face replacement in photographs can easily achieve realistic results, face replacement in video is still a challenging problem, in part due to large appearance variations caused by, light conditions, viewing angles, body poses and mutual occlusions, as well as the different perceptual sensitivity to both the static and dynamic elements of faces. Existing methods for video face replacement mainly focus on two aspects: facial motion capture, and face editing in images. However, to capture the facial motion in video, current systems usually require complex and expensive hardware to get a 3D-morphable model. Such face editing based methods rely on blending the source face into the target face and do not make full use of available temporal information in video sequence.

Another problem often associated with face replacement is that of face alignment. Face alignment aims at locating facial key points given a 2D image. As with face replacement, large variations in poses, expressions and lighting conditions provide challenges. Available approaches to improving face alignment include use of Active Shape Models (ASM) and Active Appearance Models (AAM) that model the face shape and appearance by optimization approaches, such as Principal Component Analysis (PCA). However, while these methods can achieve promising results on certain datasets, their performance severely degrades on other more challenging image datasets.

Other approaches include cascade regression-based methods. Using shape indexed features, Cascade Pose Regression (CPR) and Explicit Shape Regression (ESR) progressively regress the shape stage by stage over the cascade random fern regressors, which are sequentially learnt. Supervised Descent Method (SDM) cascades several linear regression models and achieves the superior performance with the shape indexed SIFT features. Robust Cascade Pose Regression (RCPR) improves CPR with enhanced the shape indexed features and more robust initializations. Local Binary Feature (LBF) is learnt for highly accurate and fast face alignment. Furthermore, Coarse-to-Fine Shape Searching (CFSS) can achiev high accuracy by utilizing a coarse-to-fine shape searching method.

SUMMARY

In one described embodiment, a face replacement method for replacing a target face with a source face includes the steps of determining facial landmarks in both the target and the source face using a cascade multichannel convolutional neural network (CMC-CNN). Next, the source face is warped using its determined facial landmarks to match the determined facial landmarks of the target face. The facial region of interest is selected in the source face and the target face is blended with the source region of interest selection.

In some embodiments, input to the CMC-CNN is derived from a single video frame, an initial face shape, and a ground truth shape. In other embodiments, facial landmarks are determined through a cascade regression process. Warping the source face can be done using determined facial landmarks and a Delaunay triangulation to maximize a minimum angle for constructed triangle. Binary masking can be used to select a facial region of interest in the source face. In one embodiment, Poisson Image Editing can be used to blend the target face with the source region of interest selection.

In another embodiment, a face replacement system for replacing a target face with a source face can include a facial landmark determination model having a cascade multichannel convolutional neural network (CMC-CNN) to process both the target and the source face. A face warping module is able to warp the source face using determined facial landmarks that match the determined facial landmarks of the target face; and a face selection module is able to select a facial region of interest in the source face. An image blending module is used to blend the target face with the selected source region of interest.

In some embodiments a single video frame, an initial face shape, and a ground truth shape are input to the CMC-CNN. Facial landmarks can be determined by iteration through a cascade regression process, and the source face can be warped using determined facial landmarks and a Delaunay triangulation to maximize a minimum angle for constructed triangle. In further embodiments, a binary mask can be created from the selected facial region of interest in the source face, and a Poisson Image Editing is used to blend the target face with the source region of interest selection.

In another described embodiment, face alignment method for identifying facial landmarks in an image includes the steps of inputting an image, an initial face shape, and ground truth shape. This input is processed with multiple convolutional layers and max pooling layers to produce a feature map. Processing initial face shape using region of interest pooling around facial landmarks is used to determine region of interest pooling features; and concatenating and mapping region of interest pooling features onto fully connected layers and a long short-term memory layer allows for a reliable solution output.

In one embodiment, identifying facial landmarks in an image include the step of calculating ground truth shape increment and/or calculating middle level features. In one embodiment, a system can support input of multiple images from video.

In another embodiment, a face alignment system for identifying facial landmarks in an image includes an input module that inputs an image, an initial face shape, and ground truth shape. A feature map creation module can process the input with multiple convolutional layers and max pooling layers to produce a feature map; while a region of interest module is used to process initial face shape using region of interest pooling around facial landmarks to determine region of interest pooling features. In other embodiments, a concatenating and mapping region of interest pooling feature module provides data to fully connected layers and a long short-term memory layer.

In one embodiment, a face alignment system for identifying facial landmarks in an image has a ground truth shape increment and/or middle level features calculated. Such a face alignment system can support processing of multiple video input image.

BRIEF DESCRIPTION OF THE DRAWINGS

FIG. 7 illustrates an algorithm usable with a face alignment recurrent neural network architecture for a single image;

FIG. 9 illustrates an algorithm usable with a face alignment recurrent neural network architecture for a video images.

DETAILED DESCRIPTION

Figure 1:
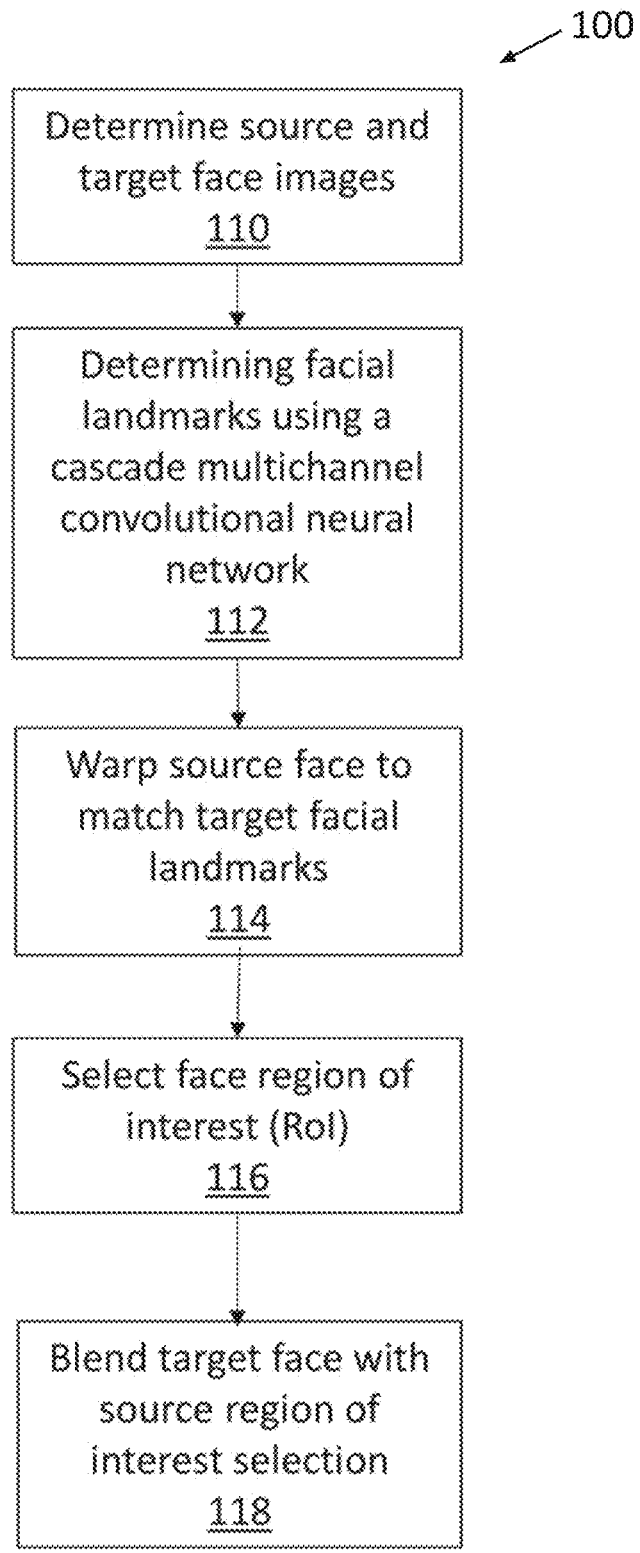
FIG. 1 is a system and method for video face replacement.

FIG. 1 is a cartoon illustrating a method 100 for an automatic face replacement system. Source and target face images are determined (step 110), and facial landmarks are determined using a cascade multichannel convolutional neural network (CMC-CNN) in step 112. The source face facial landmarks are warped to match target face facial landmarks (step 114), and face region of interest (RoI) is selected in step 116. In a final step, the target face is blended with source region of interest selection to complete the automatic face replacement.

Figure 2:
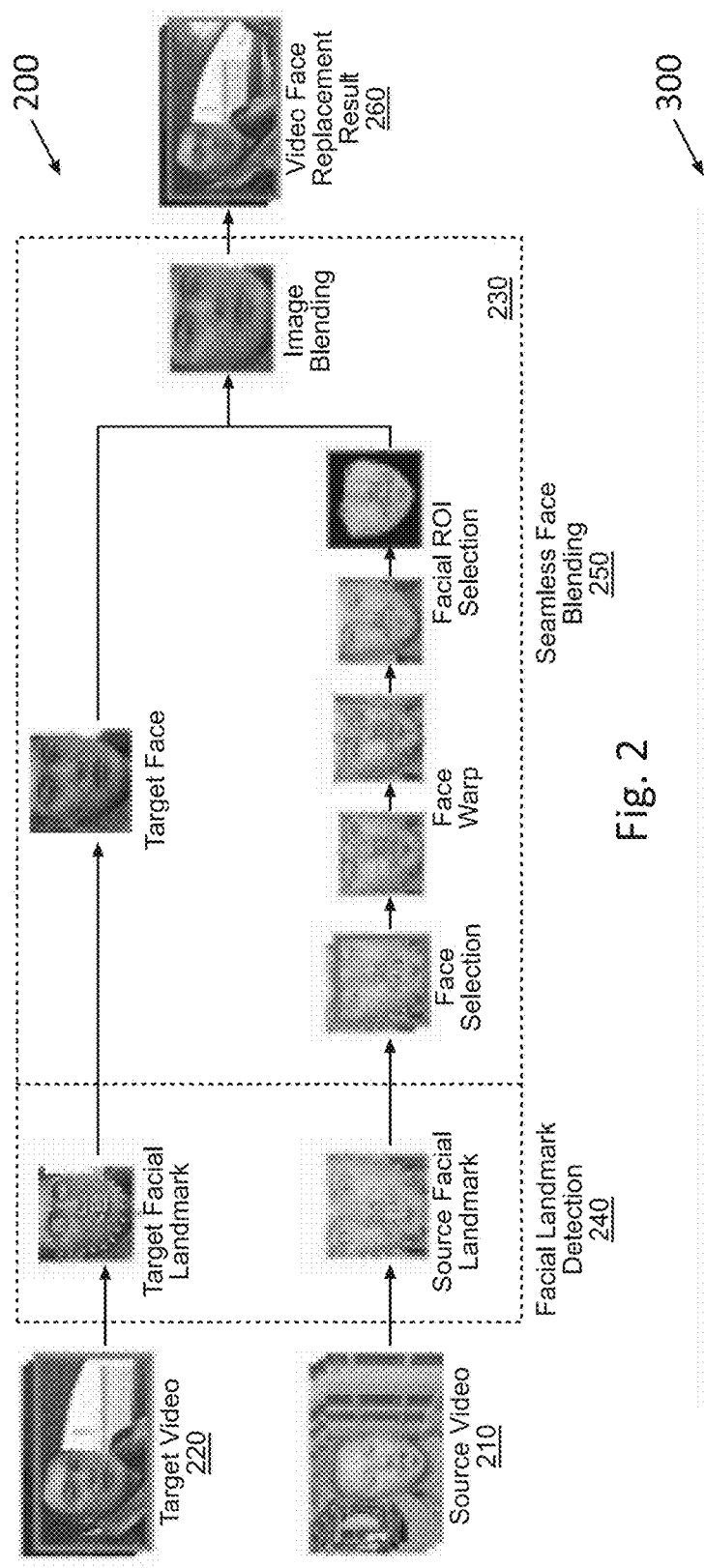
FIG. 2 illustrates face replacement with facial landmark detection and seamless face blending.

The described method of FIG. 1 can be implemented with system architectures such as discussed with respect to FIG. 2. As seen in FIG. 2, two videos can be input into the system 200: a source video 210 and a target video 220. The system 200 acts to select a complete face from source video 210 and transplant it into the target video 220 to provide a resultant video with a face replacement. A processing module 230 includes both facial landmark detection 240 and seamless face blending 250. The processing module 230 detects facial landmarks using a Cascade Multi-Channel Convolutional Neural Network (CMC-CNN) model based on deep learning in both source video and target video. In contrast to conventional CNN architectures, the CMC-CNN provides a multi-channel cascade able to reject non-useful facial landmarks at early, low resolution stages, while verifying facial landmarks during later high-resolution stages. Once determined, the facial landmarks can be used to construct 2D face models to capture facial motion in video. The processing module 230 also selects the candidate image from the source video.

More specifically, the CMC-CNN model takes a single video frame I, an initial face shape $S^0$ and the ground truth shapes $\hat{S}$ as inputs, where $S \in \Box^{2*p}$ denotes the 2D positions of facial landmarks, and p is the number of facial landmarks. The whole model works as a cascade.

For an input facial image $I_i$ and the corresponding initial shape $S_i^0$, face shape can be predicted $S_i$ in a cascade manner. At stage t, the facial shape $S_i^t$ is updated by refining $S_i^{t-1}$ with the shape increment $\Delta S_i^t$. The process can be presented as follows:

$$S_i^t = S_i^{t-1} + R^t(I_i, S_i^{t-1})$$

where $R^t$ denotes the regressor at stage t, which computes the shape increment $\Delta S_i^t$ based on the image $I_i$ and previous facial shape $S_i^{t-1}$.

In the training process, the $t_{th}$ stage regressor $R^t$ is learned by minimizing the alignment error on the training set $\{I_i, \hat{S}_i, S_i^0\}_{i=1}^N$. This process can be expressed as follows:

$$R^t = \arg\min_{R^t} \sum_{i=1}^{N} \|\hat{S}_i - (S_i^{t-1} + R^t(I_i, S_i^{t-1}))\|_2$$

where $\hat{S}_i$ denotes the ground truth shape of image $I_i$.

The predicted facial shape $S_i$ will be more and more close to the ground truth shape $\hat{S}_i$ through the cascade regression process. The process iterates until the predicted shape $S_i$ converges.

Seamless face blending includes the steps of 1) face selection, 2) image warp, and 3) image blending. Face selection for a facial image I in the target video proceeds by obtaining its face shape S, and then finding a most similar image in the source video. First, all shapes are normalized by a meanshape. Then, l2-norm is used to represent the similarity. More specifically, $x_i$ can be the position of the $i^{th}$ landmark in the image I and $\bar{x}_i$ can be the position of the $i^{th}$ landmark of the meanshape. The scale parameter s and translation t can be calculated as follows:

$$s, t = \arg\min_{s,t} \sum_{i=1}^{p} \|\bar{x}_i - (s \cdot x_i + t)\|_2$$

Then the most similar face image in the source video can be retrieved as follows:

$$idx = \arg\min_{i} \|S'_{in} - S'_i\|_2, \quad i = 1, 2, 3 \ldots M$$

Where S' is the normalized shape, and M is the number of face images in the source video.

Image warp proceeds by taking p facial landmarks and constructing a triangulation that would cover the convex hull of all the facial points. To achieve this, a Delaunay triangulation, which follows the max-min criterion can be constructed to maximize the minimum angles in all triangles. Next, a linear interpolation between two triangles is made. For instance, $[(X_1,Y_1),(x_1,y_1)]$, $[(X_2,Y_2),(x_2,y_2)]$ and $[(X_3,Y_3),(x_3,y_3)]$ are three corresponding control points' coordinates, for which a linear interpolation function $X=f(x,y)$ and $Y=g(x,y)$ that overlays the triangles can be provided. This problem can be solved as follows:

$$Ax+By+CX+D=0$$

where $$A = \begin{vmatrix} y_1 & X_1 & 1 \\ y_2 & X_2 & 1 \\ y_3 & X_3 & 1 \end{vmatrix}; \quad B = -\begin{vmatrix} x_1 & X_1 & 1 \\ x_2 & X_2 & 1 \\ x_3 & X_3 & 1 \end{vmatrix}; \quad C = \begin{vmatrix} x_1 & y_1 & 1 \\ x_2 & y_2 & 1 \\ x_3 & y_3 & 1 \end{vmatrix};$$

$$D = \begin{vmatrix} x_1 & y_1 & X_1 \\ x_2 & y_2 & X_2 \\ x_3 & y_3 & X_3 \end{vmatrix}.$$

Figure 3:
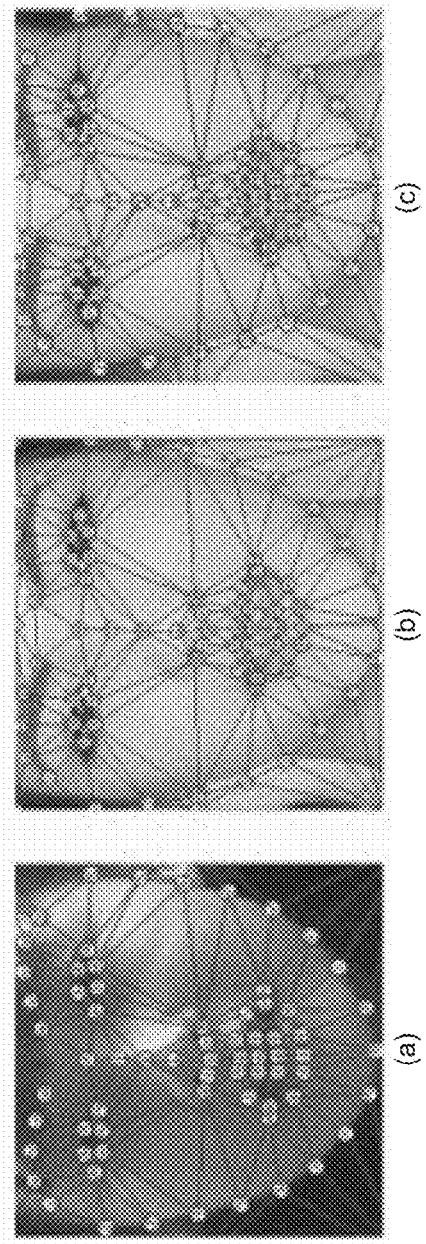
FIG. 3 illustrates Delaunay triangulation and local image warp.

FIG. 3 illustrates the previously discussed Delaunay triangulation and local image warp with several pictures 300A, 300B, and 300C that include a face, facial landmarks, and triangulation. Picture 300A is the target face Delaunay triangulation; Picture 300B is the source face Delaunay triangulation; and Picture 300C is the warped source face referring to the target face Picture 300A.

Figure 4:
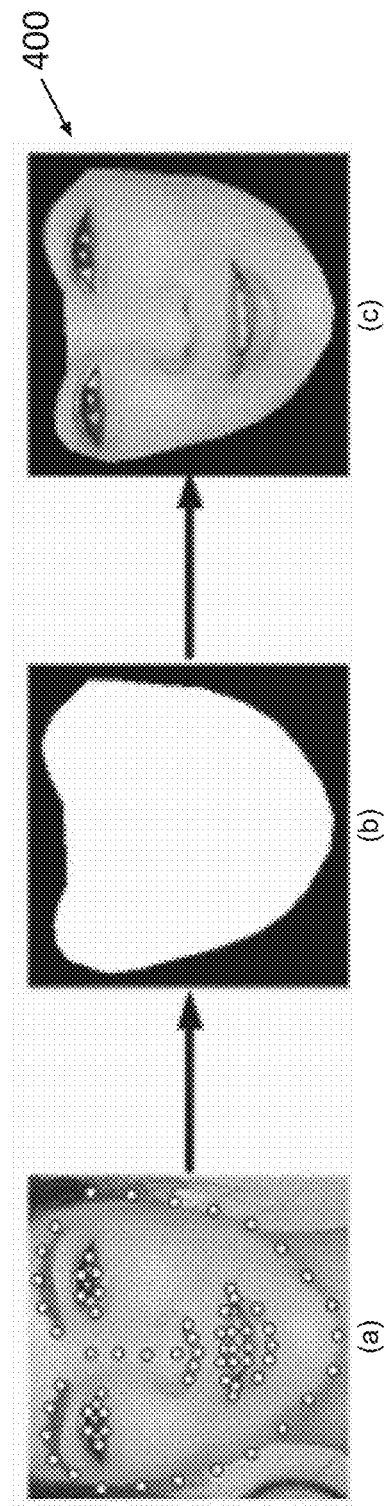
FIG. 4 illustrates binary mask construction and use.
Figure 5:
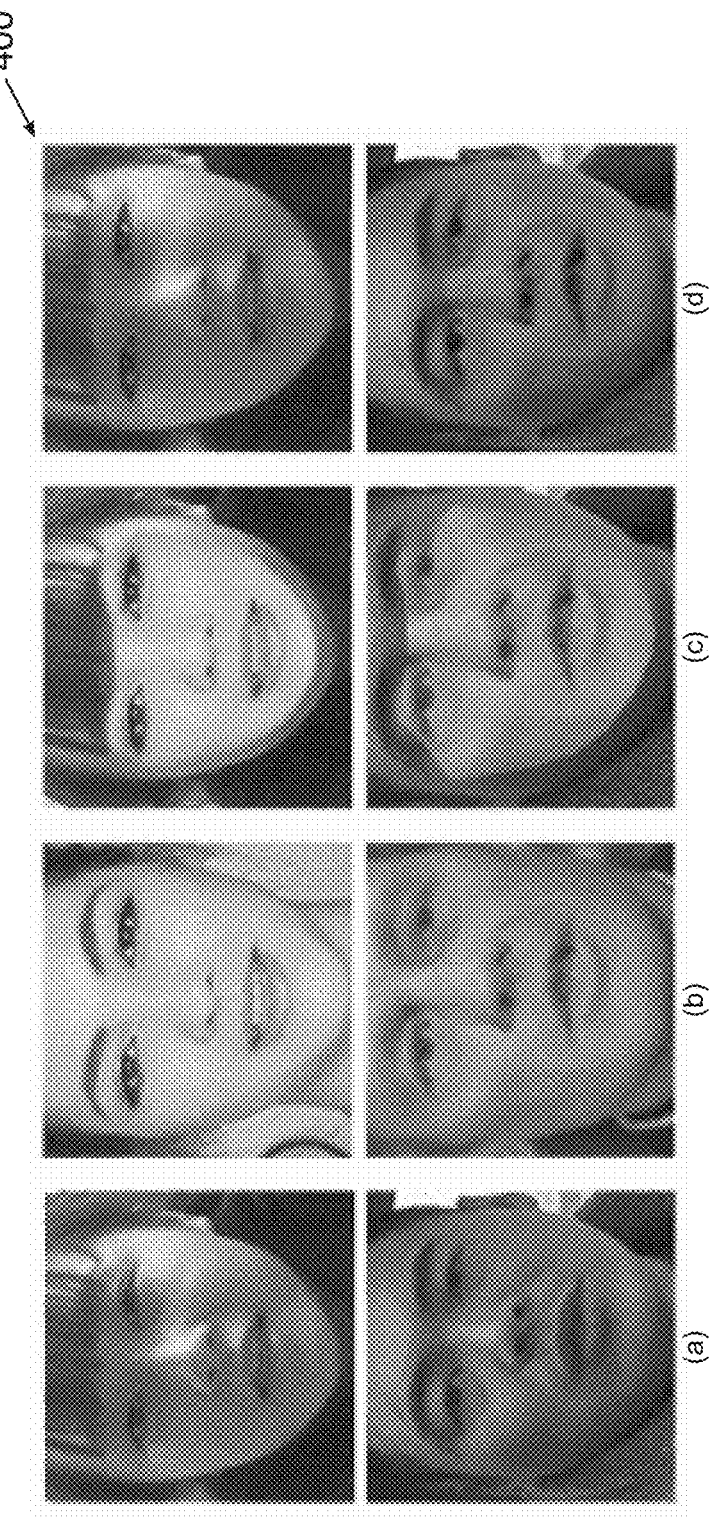
FIG. 5 illustrates face replacement results for male and female images.

Image blending results in a blend of the warped source face into the target face, and is needed to produce natural and realistic face replacement results. The details of image blending are illustrated in 400A, 400B, and 400C of FIG. 4. Based on the detected landmarks in a face such as shown in 400A, a binary facial mask 400B is created. Some morphological operations such as corrosion and dilation can be applied to the binary mask to eliminate noise around the boundary of the mask. Then, utilizing the binary facial mask, an accurate facial Region of Interest (ROI) as seen in 400A. The system can automatically select the facial ROI, according to the detected facial landmarks. After getting the facial ROI in source image and target image, a Poisson Image Editing technique or other picture compositing method can be used to seamlessly blend the source face into target face. Some replacement results are shown in FIG. 5, where two sets of pictures (female and male) are illustrated. Pictures 500A are the target face images; 500B are the source face images; 500C are the replacement results without image blending; and 500D are the replacement results using Poisson Image Editing.

Face alignment of video images, where key facial points are identified in a 2D image, can be approached with various methods. In one embodiment, for a single image version, given a data set with N training samples, denoted as $\{I_i, \hat{S}_i, S_i^0\}_{i=1}^N$, a network's parameter θ can be optimized as follows:

$$\theta = \arg\min_\theta f(I_i, \hat{S}_i, S_i^0, T, \theta),$$

where $\hat{S}_i$ indicates the ground truth shape of image $I_i$, $S_i^0$ indicates the initial shape, T indicates the stage number. In experiments, mean shape $\bar{S}$ is employed as the initial shape, which can be calculated as follows:

$$\bar{S} = \frac{1}{N}\sum_{i=1}^N \hat{S}_i.$$

f can be defined as:

$$f \doteq \sum_{t=1}^T \lambda_t \sum_{i=1}^N \|(\hat{S}_i - S_i^{t-1}) - R(I_i, S_i^{t-1}, x_i^{t-1}, \theta)\|,$$

where $\lambda_t$ indicates the factor of each stage, R indicates the regressor with parameter θ, $x_i^{t-1}$ indicates the middle level feature of stage t−1. Also:

$$x_i^t = g(I_i, S_i^{t-1}, x_i^{t-1}, \theta),$$

$$x_i^{t-1} = g(I_i, S_i^{t-2}, x_i^{t-2}, \theta),$$

...

$$x_i^1 = g(I_i, S_i^0, x_i^0, \theta),$$

$$x_i^0 \doteq 0.$$

which indicates that current stage t shape $S_i^t$ is not only dependent on the stage t−1 shape and middle-level feature $X_i^{t-1}$ but also all previous stage shapes and middle-level information.

Figure 6:
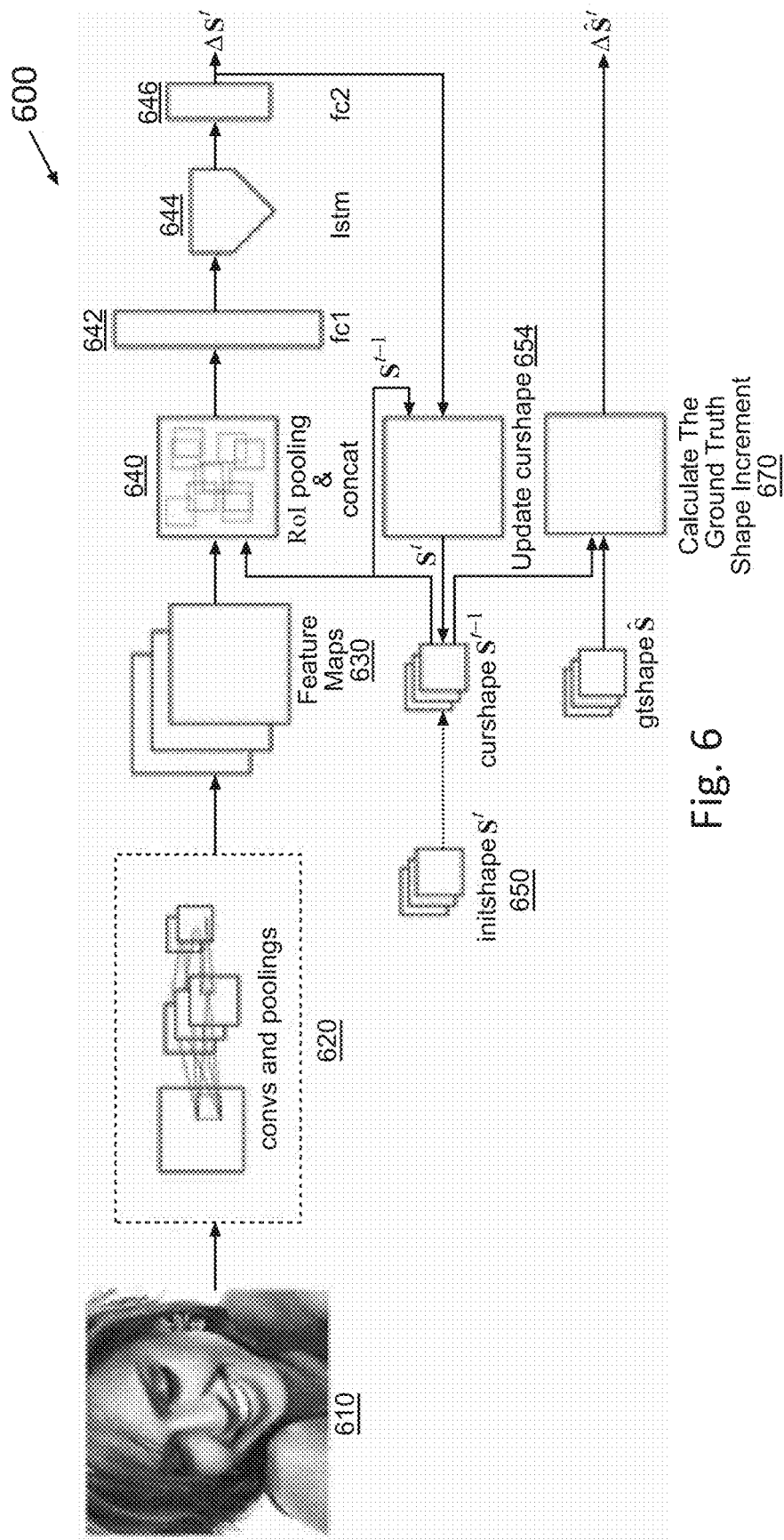
FIG. 6 illustrates a face alignment recurrent neural network architecture for a single image.

FIG. 6 and representative Algorithm 1 seen in FIG. 7, together illustrate an embodiment of a Face Alignment Recurrent Networks (FARN) system 600 for one single image. In the training process, the system 600 takes an entire image, an initial face shape, and ground truth shape as inputs 610. The system 600 first processes the whole image with several convolutional layers and max pooling layers 620 to produce a feature map 630. Then, for the initial face shape, Region of Interest (RoI) pooling 640 is provided around the region of each landmark. Then, these RoI pooling features are concatenated and mapped into fully-connected layers 642 and 646, and a long short-term memory (LSTM) layer 646. The network then outputs the predicted shape increment for the initial shape. In this embodiment, the initial shape can be updated (module 654). First, the above described method is recurrently processed, but with the initial shape 650 processed to provide an updated shape on the convolutional feature map. The process is set to recur T times. Note that ground truth shape increment is calculated (module 670) at each stage. LSTM layers of different stages can share weights and the network is end-to-end trained.

The described system 600 and algorithm can be extended from image to video and can fully make use of information among frames.

Similar to the previously discussed image version, given $N_V$, $N_F$ long training video samples as $\{\{I_{i,f}, \hat{S}_{i,f}\}_{f=1}^{N_F}, S_i^0\}_{i=1}^{N_V}$, the same optimized function can be used as shown below. To make full use of the information between frames in videos, we define the $f^{th}$ frame of the video i image $I_{i,f}$'s initial shape $S_{i,f}^0$ as follows:

$$S_{i,f}^0 = S_{i,f-1}^T$$

Middle level information of previous frames is defined as follows:

$$x_{i,f}^t = g(I_{i,f}, S_{i,f}^{t-1}, x_{i,f}^{t-1}, \theta),$$

$$x_{i,f}^{t-1} = g(I_{i,f}, S_{i,f}^{t-2}, x_{i,f}^{t-2}, \theta),$$

...

$$x_{i,f}^1 = g(I_{i,f}, S_{i,f}^0, x_{i,f}^0, \theta),$$

$$x_{i,f}^0 = g(I_{i,f-1}, S_{i,f-1}^T, x_{i,f-1}^T, \theta).$$

$$x_{i,0}^T \doteq 0.$$

The current stage t is not only dependent on the previous stage shapes and middle level information, but also on shapes and information in previous frames.

Figure 8:
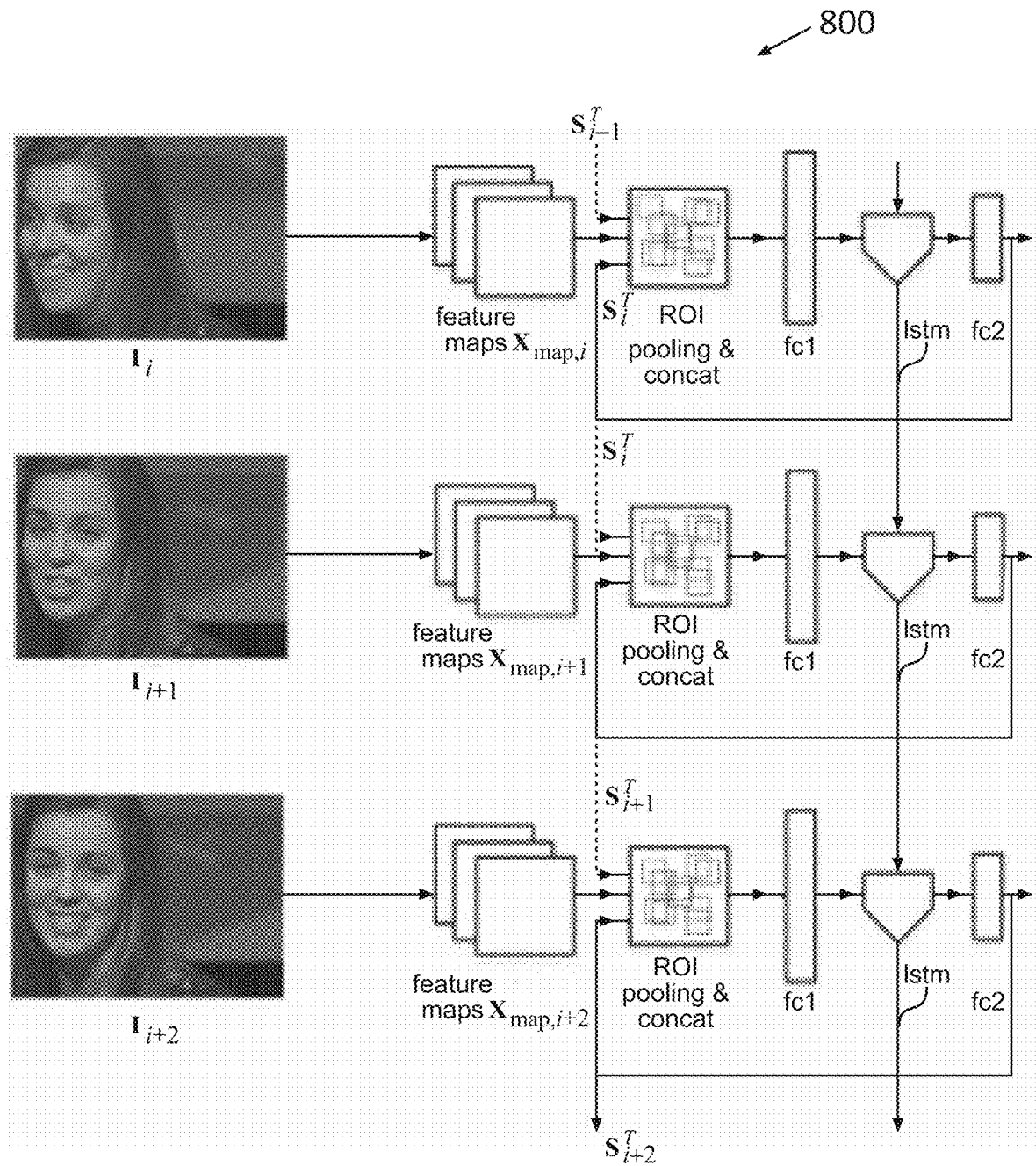
FIG. 8 illustrates a face alignment recurrent neural network architecture for video images.

FIG. 8 and representative Algorithm 2 seen in FIG. 9, together illustrate an embodiment of a Face Alignment Recurrent Networks system 800 suitable for video images. Similar to the network discussed with respect to FIG. 6, the system 800 processes multiple video image frames using initial face shape and ground truth shape as inputs. The system uses feature maps that are provided Region of Interest (RoI) pooling and concatenation layers. These layers are mapped into fully-connected layers, and a long short-term memory (LSTM) layer. The network then outputs the predicted shape increment for the initial shape.

In effect, the disclosed methods turn existing cascade shape regression into a recurrent network-based approach, which can be jointly trained among stages to avoid over-strong/weak regressors as in the cascade fashion. In this way, the last several stage regressors can be trained well. Advantageously, in a deep neural network, the extracted middle level representation brings useful information for the shape estimation of the next stage. Such information can be modeled well in the LSTM layer. For face landmarks tracking, the current frame's results are dependent not only on the former frames' result, but also on the middle level information. Turning the existing cascade shape regression into a recurrent network based approach allows joint training between stages to avoid over-strong/weak regressors as in the cascade fashion.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
accessing a source video frame including a source face of a person, the source face having source face shape;
accessing a target video frame including a target face of another person;
detecting a plurality of 2D source facial landmarks in the source face using a cascade multichannel convolutional neural network (CMC-CNN);
detecting a corresponding plurality of 2D target facial landmarks in the target face using the CMC-CNN and that correspond to the plurality of 2D source facial landmarks;
using a regressor to incrementally predict a target face shape based on the target face and an initial target face shape;
finding another source video frame including another source face of the person that has another source face shape that is more similar to the target face shape than the source face shape;
warping the other source face using the plurality of 2D source facial landmarks to match the corresponding plurality of 2D target facial landmarks;
selecting a source facial region of interest in the other source face; and
blending the target face with the source facial region of interest.

2. The method of claim 1, further comprising inputting the source video frame, the target video frame, the initial target face shape, and a ground truth shape to the CMC-CNN.

3. The method of claim 1, further comprising iterating through a cascade regression process to detect the corresponding plurality of 2D target facial landmarks.

4. The method of claim 1, wherein warping the other source face comprises using a Delaunay triangulation on the plurality of 2D source facial landmarks to maximize a minimum angle for a constructed triangle.

5. The method of claim 1, further comprising creating a binary mask from the source facial region of interest.

6. The method of claim 1, wherein blending the target face with the source facial region of interest comprises blending using a Poisson Image Editing.

7. A face replacement system for replacing a target face with a source face, comprising:
a frame access module configured to access a source video frame including a source face of a person, wherein the source face includes a source face shape, and configured to access a target video frame includes a target face of another person;
a facial landmark determination model configured to detect a plurality of 2D source facial landmarks in the source face using a cascade multichannel convolutional neural network (CMC-CNN) to process both the target and the source face and configured to detect a corresponding plurality of 2D target facial landmarks in the target face using the CMC-CNN and that correspond to the plurality of 2D source facial landmarks;
a regressor configured to incrementally predict a target face shape based on the target face and an initial target face shape;
a similarity module configured to find another source video frame including another source face of the person that has another source face shape that is more similar to the target face shape than the source face shape;
a face warping module configured to warp the other source face using the plurality of 2D source facial landmarks to match the the corresponding plurality of 2D target facial landmarks;
a face selection module configured to select a source facial region of interest in the other source face; and
an image blending module configured to blend the target face with the source facial region of interest.

8. The face replacement system of claim 7, wherein the source video frame, the target video frame, the initial target face shape, and a ground truth shape are input to the CMC-CNN.

9. The face replacement system of claim 7, wherein the facial landmark determination model being configured to detect a plurality of 2D source facial landmarks comprises the facial landmark determination model being configured to iterate through a cascade regression process.

10. The face replacement system of claim 7, wherein the face warping module being configured to warp the other source face comprises the face warping module being configured to warp the source face using a Delaunay triangulation on the plurality of 2D source facial landmarks to maximize a minimum angle for a constructed triangle.

11. The face replacement system of claim 7, further comprising the face selection module being configured to create a binary mask from the selected facial region of interest in the source face.

12. The face replacement system of claim 7, wherein the image blending module being configured to blend the target face with the source facial region of interest comprising the image blending module being configured to use a Poisson Image Editing is used to blend the target face with the source facial region of interest selection.

13. A system comprising:
a processor; and
system memory coupled to the processor and storing instructions configured to cause the processor to:
access a source video frame including a source face of a person, the source face having source face shape;
access a target video frame including a target face of another person;
detect a plurality of 2D source facial landmarks in the source face using a cascade multichannel convolutional neural network (CMC-CNN);

detect a corresponding plurality of 2D target facial landmarks in the target face using the CMC-CNN and that correspond to the plurality of 2D source facial landmarks;

use a regressor to incrementally predict a target face shape based on the target face and an initial target face shape;

find another source video frame including another source face of the person that has another source face shape that is more similar to the target face shape than the source face shape;

warp the other source face using the plurality of 2D source facial landmarks to match the corresponding plurality of 2D target facial landmarks;

select a source facial region of interest in the other source face; and blend the target face with the source facial region of interest.

14. The system of claim 13, further comprising instructions configured to input the source video frame, the target video frame, the initial target face shape, and a ground truth shape to the CMC-CNN.

15. The system of claim 13, further comprising instructions configured to iterate through a cascade regression process to detect the corresponding plurality of 2D target facial landmarks.

16. The system of claim 13, wherein instructions configured to warp the other source face comprise instructions configured to use a Delaunay triangulation on the plurality of 2D source facial landmarks to maximize a minimum angle for a constructed triangle.

17. The system of claim 13, further comprising instructions configure to create a binary mask from the source facial region of interest.

18. The system of claim 13, wherein instructions configured to blend the target face with the source facial region of interest comprises instructions configured to blend using a Poisson Image Editing.

* * * * *